United States Patent
Chinen et al.

(10) Patent No.: US 9,805,292 B2
(45) Date of Patent: Oct. 31, 2017

(54) PROVIDING IMAGE SEARCH TEMPLATES

(71) Applicant: Google Inc., Mountain View, CA (US)

(72) Inventors: Troy Chinen, Newark, CA (US); Ameesh Makadia, New York, NY (US); Corinna Cortes, New York, NY (US); Hartwig Adam, Los Angeles, CA (US); Nemanja Petrovic, Plainsboro, NJ (US); Teresa Ko, Los Angeles, CA (US); Sebastian Pueblas, Astoria, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/474,356

(22) Filed: Mar. 30, 2017

(65) Prior Publication Data
US 2017/0206439 A1    Jul. 20, 2017

Related U.S. Application Data

(63) Continuation of application No. 14/798,569, filed on Jul. 14, 2015, now Pat. No. 9,639,782, which is a
(Continued)

(51) Int. Cl.
*G06K 9/00* (2006.01)
*G06K 9/62* (2006.01)
(Continued)

(52) U.S. Cl.
CPC ..... *G06K 9/6267* (2013.01); *G06F 17/30259* (2013.01); *G06F 17/30277* (2013.01);
(Continued)

(58) Field of Classification Search
USPC .......................................... 382/103, 181–231
See application file for complete search history.

(56) References Cited

U.S. PATENT DOCUMENTS

| | | | |
|---|---|---|---|
| 5,546,475 A * | 8/1996 | Bolle | G06K 9/4647 382/110 |
| 5,554,983 A | 9/1996 | Kitamura et al. | |

(Continued)

OTHER PUBLICATIONS

"eBay Motors mobile photo-template," [online] [Retrieved on May 28, 2014]; Retrieved from the Internet URL: http://www.behance.net/gallery/eBay-Motoers-mobile-photo-template, 3 pages.
(Continued)

*Primary Examiner* — Alex Liew
(74) *Attorney, Agent, or Firm* — Fish & Richardson P.C.

(57) ABSTRACT

Techniques for providing image search templates are provided. An image search template may be associated with an image search query to aid the user in capturing an image that will be appropriate for processing the search query. The template may be displayed as an overlay during an image capturing process to indicate an appropriate image capturing pose, range, angle, or other view characteristics that may provide more accurate search results. The template may also be used in the image search query to segment the image and identify features relevant to the search query. Images in an image database may be clustered using characteristics of the images or metadata associated with the images in order to establish groups of images from which templates may be derived. The generated templates may be provided to users to assist in capturing images to be used as search engine queries.

20 Claims, 8 Drawing Sheets

Related U.S. Application Data continuation of application No. 13/659,148, filed on Oct. 24, 2012, now Pat. No. 9,087,269.

(60) Provisional application No. 61/692,771, filed on Aug. 24, 2012.

(51) Int. Cl.
*H04N 5/232* (2006.01)
*G06F 17/30* (2006.01)

(52) U.S. Cl.
CPC ......... *G06K 9/6202* (2013.01); *G06K 9/6215* (2013.01); *H04N 5/23222* (2013.01); *H04N 5/23296* (2013.01)

(56) References Cited

U.S. PATENT DOCUMENTS

| | | | |
|---|---|---|---|
| 5,644,765 | A | 7/1997 | Shimura |
| 5,805,727 | A | 9/1998 | Nakano |
| 5,943,442 | A | 8/1999 | Tanaka et al. |
| 6,292,596 | B1 | 9/2001 | Snyder et al. |
| 2001/0048774 | A1 | 12/2001 | Seki |
| 2001/0051007 | A1 | 12/2001 | Teshima |
| 2002/0168117 | A1 | 11/2002 | Lee et al. |
| 2003/0103648 | A1 | 6/2003 | Ito et al. |
| 2004/0022437 | A1 | 2/2004 | Beardsley |
| 2005/0226508 | A1 | 10/2005 | Gotohda |
| 2009/0052734 | A1 | 2/2009 | Hosaka |
| 2009/0116752 | A1 | 5/2009 | Isomura et al. |

OTHER PUBLICATIONS

"USAA app lets iPhone users deposit checks," [online] [Retrieved on May 28, 2014]; Retrieved from the Internet URL: http://www.cnet.com/news/usaa-app-lets-iphone-users-deposit-checks, 3 pages.
Office Action issued in U.S. Appl. No. 13/659,148 dated Aug. 22, 2014, 12 pages.
Office Action issued in U.S. Appl. No. 13/659,148 dated Feb. 10, 2015, 9 pages.
Notice of Allowance issued in U.S. Appl. No. 13/659,148 dated Apr. 15, 2015, 9 pages.
Office Action issued in U.S. Appl. No. 14/798,569, dated Nov. 19, 2015, 14 pages.
Office Action issued in U.S. Appl. No. 14/798,569, dated Jun. 1, 2016, 17 pages.
Office Action issued in U.S. Appl. No. 14/798,569, dated Sep. 29, 2016, 13 pages.
Notice of Allowance issued in U.S. Appl. No. 14/798,569, dated Jan. 25, 2017, 11 pages.

* cited by examiner

PROVIDING IMAGE SEARCH TEMPLATES

CROSS REFERENCE TO RELATED APPLICATIONS

This application is a continuation of U.S. patent application Ser. No. 14/798,569, filed Jul. 14, 2015, which is a continuation of U.S. patent application Ser. No. 13/659,148, filed Oct. 24, 2012, now issued as U.S. Pat. No. 9,087,269, which issued on Jul. 21, 2015, which claims the benefit of the filing date of U.S. Provisional Patent Application No. 61/692,771 filed Aug. 24, 2012, the disclosure of which are hereby incorporated herein by reference.

BACKGROUND

As more and more data is hosted on the Internet, new techniques have been developed for sorting, organizing, and accessing this information. One common tool is the Internet search engine. Search engines allow a user to input a text query and receive a list of results associated with that query. The user may then access the result they deem most relevant to their query to receive additional information.

Such scenarios require the user to identify a text query that approximates the contents of their image, often leading to inaccurate results. Other search engines may offer an image based search option, where a user may upload a target image to initiate a search based on features of the image. One way that a search engine may process an image search query is to identify pictures that have similar pixels to those of the image search query.

SUMMARY

Aspects of the disclosure provide a system and method for providing image search templates. An image search template may be associated with an image search query to aid the user in capturing an image that will be appropriate for processing the search query. The template may be displayed as an overlay during an image capturing process to indicate an appropriate image capturing pose, range, angle, or other view characteristics that may provide more accurate search results. The template may also be used in the image search query to segment the image and identify features relevant to the search query. Images in an image database may be clustered using characteristics of the images or metadata associated with the images in order to establish groups of images from which templates may be derived. Templates may be generated automatically or manually. The generated templates may be provided to users to assist in capturing images to be used as search engine queries.

In accordance with one aspect of the disclosure, a computer-implemented method comprises classifying a plurality of images in an image database into a plurality of categories; clustering, using a processor, the plurality of images in a given category; identifying a canonical view for the given category; generating a template for the given category using the canonical view; and providing the template for use in an image capture operation.

In one example, the plurality of images is clustered based on at least one of pixel similarity, labels associated with the plurality of images, or shapes associated with the content of the plurality of images. In another example, the plurality of images is classified based on labels associated with the plurality of images. In this case, the labels may be associated with particular images in the plurality of images based on search queries in response to which the particular images were selected as a search result.

And in another example, the canonical view is determined by at least one of selecting an image cluster comprising the greatest number of images among all clusters derived from the images in the same category and selecting an image cluster comprising the most diverse images.

In accordance with another aspect of the disclosure, a computer-implemented method for performing an image search operation is provided. The method comprises receiving an image and information describing a template used to capture the image, where the template identifies a content category of the image; identifying at least one object within the image, the object associated with the content category identified in the template; and performing a search operation using the at least one identified object.

In accordance with a further aspect of the disclosure, a computer-implemented method comprises obtaining selection input for an image acquisition template corresponding to a particular category of image content; displaying an overlay associated with the image acquisition template on a camera viewfinder to indicate a canonical view for capturing an image to perform a search operation based on the particular category of image content; capturing the image; and sending the captured image to perform an image search operation using the captured image.

According to one example, the selection input for the template is obtained based upon a selection by a user from a plurality of templates. In another example, the method further comprises identifying an object type of at least one object displayed in the view finder, wherein the image acquisition template is selected based on the identified object type. In a further example, the overlay indicates at least one of a view angle or a pose. In another example, the image acquisition template is applied to an image after the image is captured. In yet another example, the method further comprises receiving search results corresponding to the identified object. In this case the search results may be related to the selected image acquisition template.

In another aspect, a non-transitory computer readable medium contains instructions that, when executed by a processor, cause the processor to perform a method comprising obtaining selection input for an image acquisition template corresponding to a particular category of image content; displaying an overlay associated with the image acquisition template on a camera viewfinder to indicate a canonical view for capturing an image to perform a search operation based on the particular category of image content; capturing the image; and sending the captured image to perform an image search operation using the captured image.

In one example, the template is obtained based on a selection by a user from a plurality of templates. In another example, the method further comprises identifying an object type of at least one object displayed in the view finder, wherein the image acquisition template is selected based on the identified object type. In a further example, the overlay indicates at least one of a view angle or a pose.

In another example, the image acquisition template is applied to an image after the image is captured. In yet another example, the method further comprises receiving search results corresponding to the identified object. Here, the search results may be related to the selected image acquisition template.

And in accordance with another aspect of the disclosure, a processing system for performing an image search is provided. The processing system comprises a memory coupled to at least one processor. The memory stores a plurality of images. The at least one processor is configured to classify the plurality of images into a plurality of categories; cluster the plurality of images in a given category to identify a canonical view for the given category; generate an image acquisition template for the given category using the canonical view; and provide the image acquisition template to an image capture device for use in an image search operation.

In one example, the plurality of images are clustered based at least one of pixel similarity, labels associated with the plurality of images, or shapes associated with the content of the plurality of images. In another example, the plurality of images is classified based on labels associated with the plurality of images. In this case, the labels may be associated with particular images in the plurality of images based on search queries in response to which the particular images were selected as a search result. And in another example, the canonical view is determined by at least one of selecting an image cluster comprising the greatest number of images among all clusters derived from the images in the same category and selecting an image cluster comprising the most diverse images.

DETAILED DESCRIPTION

The aspects, features and advantages of the present disclosure will be appreciated when considered with reference to the following description and accompanying figures. The following description does not limit the disclosure; rather, the scope is defined by the appended claims and equivalents.

While certain processes in accordance with example embodiments are shown in the figures as occurring in a linear fashion, this is not a requirement unless expressly stated herein. Different processes may be performed in a different order or concurrently.

The disclosure describes techniques for capturing an image according to an image capture template, and performing an image search using the captured image. The image capture template may be associated with a set of images that have a common element, such as common subject matter or a common type of object displayed. The image capture templates may be used to identify and define the content of the image, e.g., the visual features of the image. An image capture template may be selected during the image capture operation. For example, a user may indicate the type of item that is being photographed, or the capture device may attempt to identify the item category to select an appropriate template. The selected template may be used to display an overlay on the capture device to indicate a "canonical" view of the item. This canonical view may refer to a particular pose, viewing angle, or other way of viewing the image that enables capturing of an image that will yield optimal results when used in an image search operation.

When a user uploads a captured image as a search query to perform an image search, similar source images to the target image may be identified. Image search results provided according to the template and capturing process may be constrained by the template. For example, if the user selects a template for "shoes," then the image search operation may return results that depict shoes and other footwear.

Figure 1:
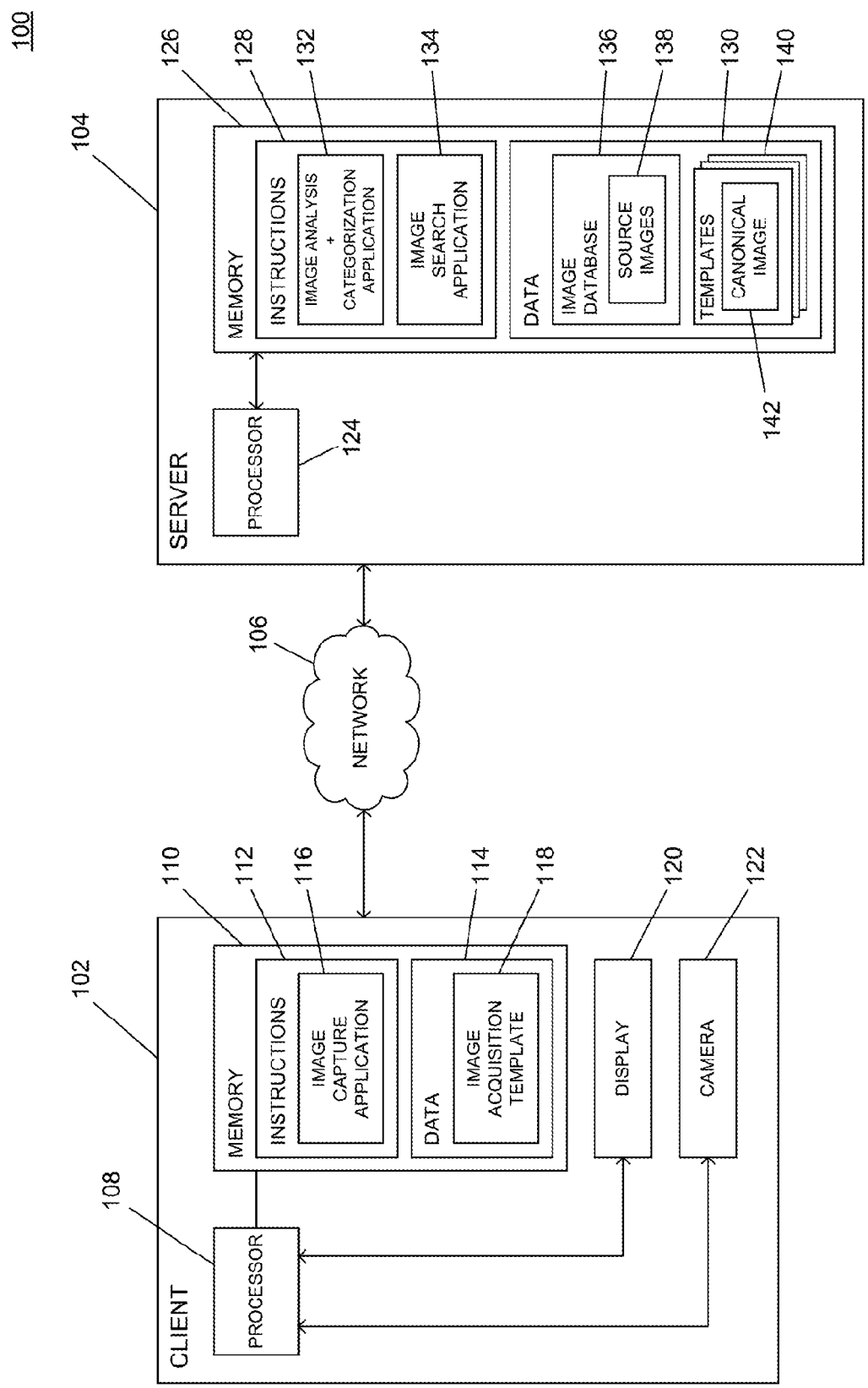
FIG. 1 is a system diagram depicting an example of an image search system in accordance with aspects of the disclosure.

FIG. 1 presents a schematic diagram of a computer system 100 depicting various computing devices, such as a client 102 and a server 104, that can be used alone or in a networked configuration in accordance with aspects of the disclosure. For example, this figure illustrates the client 102 and the server 104 in communication via a network 106. The client 102 allows a user to capture an image to initiate a search operation using the captured image. The server 104 receives the target image and performs the search operation using the target image. The server 104 may also classify and analyze images stored in an image database to identify and "templatize" sets of images in the database, to generate one or more image templates 140. These templates 140 may be used by the client 102 to assist with the image capturing process and to improve the accuracy of image search results.

The client 102 may be computing device. For example, the client 102 may be laptop computer, a desktop computer, a netbook, a rack-mounted server, a smartphone, a cellular phone, or any other device containing programmable hardware or software for executing instructions. The client 102 may include a processor 108, a memory 110, a display 120, a camera 122, and other components typically present in general purpose computers. The memory 110 may store instructions 112 and data 114 that are accessible by the processor 108. The processor 108 may execute the instructions 112 and access the data 114 to control the operations of the client 102.

The processor 108 may be any suitable processor, such as various commercially available general purpose processors. Alternatively, the processor 108 may be a dedicated controller such as an application-specific integrated circuit ("ASIC") or a field-programmable gate array ("FPGA").

The memory 110 may be any type of tangible memory operative to store information accessible by the processor 108, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The technique may include different combinations of the foregoing, whereby different portions of the instructions and data are stored on different types of media.

Although FIG. 1 functionally illustrates the processor 108 and memory 110 as each being within a single block respectively, it should be understood that the processor 108 and memory 110 may actually comprise multiple processors and memories that may or may not be stored within the same physical housing. Accordingly, references to a processor, computer or memory will be understood to include references to a collection of processors, computers or memories that may or may not operate in parallel.

The instructions 112 may be any set of instructions to be executed directly, such as machine code, or indirectly, such as scripts, by the processor 108. For example, the instructions 112 may be stored as computer code on a non-transitory computer-readable medium. In that regard, the terms "instructions" and "programs" may be used interchangeably herein. The instructions 112 may be stored in object code format for direct processing by the processor 108, or in any other computer language including scripts or collections of independent source code modules that are interpreted on demand or compiled in advance. Functions, methods and routines of the instructions are explained in more detail below and in the figures.

In order to facilitate the operations of the client 102, the instructions 112 may comprise an image capture application 116. The image capture application 116 provides an interface with the camera 122 and the data to capture images using the camera 122. The image capture application 116 may be provided as a separate application, e.g., a mobile device "app", or it may be integrated with the camera functionality of the client device 102. The camera 122 may use the display 120 as a viewfinder to identify the image that the camera 122 will capture during an image capturing operation.

The image capture application 116 allows for the selection of an image acquisition template 118 when capturing an image. The client 102 may store multiple image acquisition templates 118 in the data 114, each image acquisition template being associated with a different type of image. The selected image acquisition template 118 may be associated with the content of the particular scene the user wishes to capture. The image acquisition template 118 may be selected by the user manually, e.g., by a "drop down" menu interface provided by the image capture application 116, or automatically, such as by identifying an object type that is currently in view of the viewfinder of the camera 122. The image capture application 116 may identify a plurality of possible image acquisition templates 118 for use in the image capture operation, and the user may be prompted to select the most appropriate image acquisition template 118 from the identified possible image acquisition templates 118. The image capture application 116 may allow the user to specify a general category, e.g., "shoe" and the image capture application 116 may use the general category and the image in the viewfinder to identify a specific category, e.g., "boots," "high heels," "running shoes," etc., or vice-versa, e.g., the image capture application 116 identifies a general category and the user specifies the specific category. The user may also be prompted to confirm selection of an automatically selected image acquisition template 118 to verify that the client 102 has identified the correct template.

During the capture operation, the image capture application 116 may display an overlay on the display 120, and the overlay may be based on the selected image acquisition template 118. The displayed overlay may depict a "canonical" pose, angle, stance, or other photo capturing feature for the selected image acquisition template, such that an image of an object captured in the pose displayed in the overlay may result in increased accuracy of image search results. The image capture application 116 may detect that the object in the viewfinder conforms to the image overlay, and display a visible indication that the object is in a proper position.

Upon capturing the image, the image capture application 116 may perform an image search operation using the captured image, such as by uploading the captured image to the server 104. The image capture application 116 may be operable to receive search results associated with the image. The search results may include similar images, similar products, or other results that are relevant to the captured image provided as a search result. The image capture application 116 may display these results to the user, or they may be displayed by other means, e.g., a web browser.

The data 114 may be retrieved, stored or modified by the processor 108 in accordance with the instructions. For instance, although the architecture is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. The data may comprise any information sufficient to identify the relevant information, such as numbers, descriptive text, proprietary codes, references to data stored in other areas of the same memory or different memories, including other network locations, or information that is used by a function to calculate the relevant data.

The data 114 may store one or more image acquisition templates 118, as described above. These image acquisition templates 118 may be received from the server 104, installed with the image capture application 116, or dynamically generated by the client 102. An example of the form and content of the image acquisition template 118 is described further below, with respect to the server 104.

The server 104 may function perform image search operations using the target image 118 provided by the client 102. The server 104 may also classify, categorize, and analyze images stored in an image database 136 to generate templates 140 for use in image acquisition operations. For example, the server 104 may receive an image search query provided by the client device and the image acquisition template 118 used to capture the image, identify objects pertaining to the image acquisition template 118, and provide search results to the client 102 based on the identified objects.

The server 104 may be configured similarly to the client 102, with a processor 124 coupled to a memory 126. The memory 126 may comprise a set of instructions 128 and data 130 to facilitate the operations of the server 104. The instructions 128 may include an image analysis and categorization application 132 and an image search application 134. The data 130 may include an image database 136.

The image analysis and categorization application 132 is operable to separate source images 138 stored in the image database 136 into categories, and to determine image templates 140 for those categories. The image analysis and categorization application 132 may separate source images 138 into categories based on the contents of the images. The contents of the images may be determined based on labels applied to the images. These labels may be stored in the image database 136 along with the source images 138.

The labels may include text strings that are associated with the source images. The labels may be encoded in image metadata, or stored in a separate dataset and linked to the respective image. Labels may be associated with the source images in a variety of manners. For example, the labels may be applied to the images by noting search queries in response to which the source image is provided in an Internet search operation, the labels may be manually applied to the source images by users, or the labels may be applied to the source images using optical character recognition or other machine learning techniques.

Source images 138 that belong to a particular category may have a template generated by the image analysis and categorization application 132. The template may be generated by identifying a preferred or canonical view for each category. The term "canonical view" is not meant to imply that all images in a given category are taken from the same viewpoint, but a minimum number of images within a given category may be required to have the same view to establish that view as canonical for the category. One possible method for determining canonical views automatically is to apply image clustering techniques to images of a given category using a clustering function. The largest cluster of images in a given category that share a common view may be identified as the canonical view for that category. In some aspects, the canonical view may be manually defined by a curator of the images. Other clustering techniques may also be utilized. For example, images may be clustered based on labels that are associated with the images, or object shapes within the images may be identified, and images that contain similar shapes may be clustered together.

After establishing a canonical view, that canonical view may be used to establish a canonical image 142 for the given template 140. The canonical image 142 may be used by the client 102 as an overlay during the image capture operation performed by the image capturing application 116. Templates defined by the image analysis and categorization application 132 may be provided to the client 102 in a variety of ways. For example, they may be included with installation packages for the image capture application 116, they may be dynamically downloaded to the client 102 as they are generated, or they may be manually requested by the client 102 as needed, e.g., when selected from a "drop down" menu in the image capture application 116.

The image search application 134 is operable to receive an image search query, e.g., an image captured by the image capture application 116, and to perform an image search based on that image search query. The image search application 134 functions to perform image search and analysis functions, such as identifying similar images and providing search results in response to receiving a target image. The image search application 134 may also compare source images stored within the image database 136 with one another and with target images provided by the client 102 to identify similar images. For example, the image search application 134 may identify images with similar objects, text, colors, or other features as known in the art to identify images that are similar to one another, such as using optical character recognition techniques or pixel-by-pixel comparison. These similar images may be used to identify image search results, associated semantic entities, and other features of the image search operation. Similar images may be sub-images of one another. For example, if the target image is a photo of a jaguar with one background, e.g., a back yard, but the source image has a jaguar with a completely different background, e.g., a forest, these two images may still be identified as similar to one another.

The image search application 134 may be operable to receive information describing the template used in capturing the image to improve image search results, though the image search application 134 may also be operable to perform such an image search without receiving information describing the template. The image search application 134 may interface with the image capture application 116 to perform image search operations. The image database 136 and entity database 138 may be located external to the server 104. For example, the image database 136 and the entity database 138 may be maintained in a public manner in an open-source format.

The client 102, and the server 104 may each be at separate nodes of a network and be operative to directly and indirectly communicate with other nodes of the network 106. For example, the client 102 may comprise a mobile phone that is operative to communicate with the server 104 via the network 106.

The network 106, and the intervening nodes between the client 102 and the server 104 may comprise various configurations and use various protocols including the Internet, World Wide Web, intranets, virtual private networks, local Ethernet networks, private networks using communication protocols proprietary to one or more companies, cellular and wireless networks, e.g., Wi-Fi, instant messaging, hypertext transfer protocol ("HTTP") and simple mail transfer protocol ("SMTP"), and various combinations of the foregoing. It should be appreciated that a typical system may include a large number of connected computers. For example, the functionality of the server 104 may be spread across multiple nodes, with separate nodes hosting the image database 136, the entity database 138, and the server image search application 134.

Although certain advantages are obtained when information is transmitted or received as noted above, other aspects of the technique are not limited to any particular manner of transmission of information. For example, in some aspects, information may be sent via a medium such as an optical disk or portable drive. In other aspects, the information may be transmitted in a non-electronic format and manually entered into the system.

Figure 2:
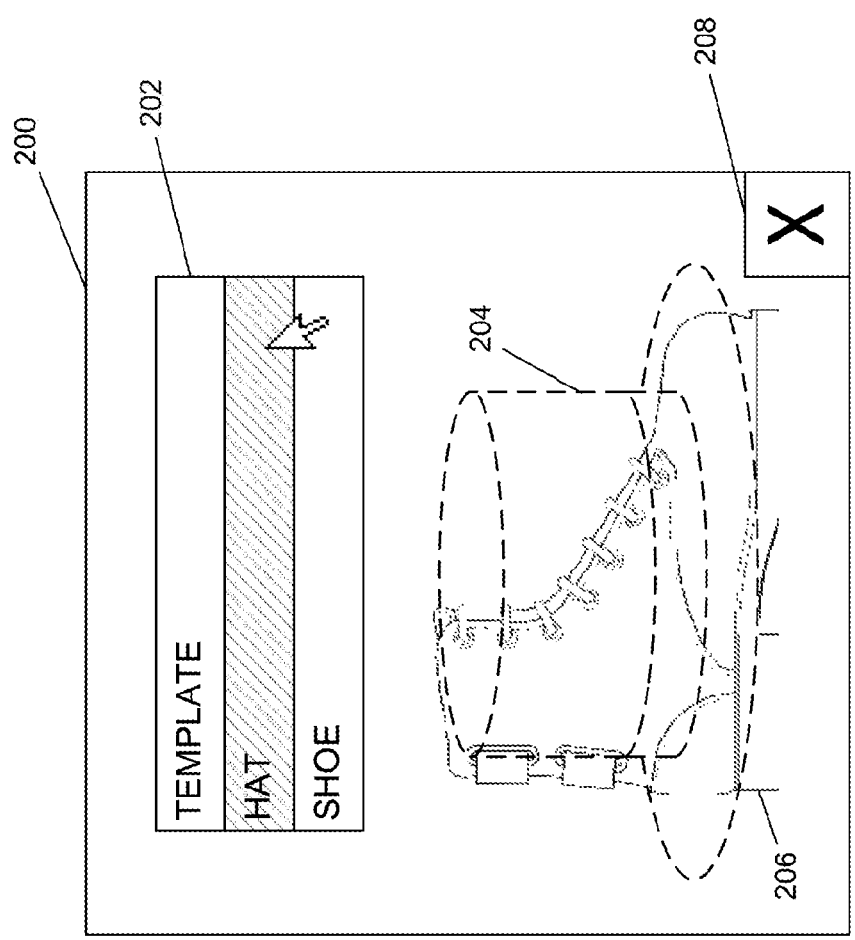
FIG. 2 is a diagram depicting an example of an image capture interface in accordance with aspects of the disclosure.

FIG. 2 is a diagram depicting an example of an image capture interface 200 in accordance with aspects of the disclosure. The image capture interface 200 is an example interface of an image capture application, such as the image capture application 116. The image capture interface 200 is operable to allow for selection of a template, display of an overlay based on the template over a camera viewfinder, and capturing of an image using the overlay.

The image capture interface 200 may contain a drop-down menu 202 for selection of an appropriate image template. In the instant example, a "hat" template has been selected from the drop-down menu 202. As described above, the image template may be selected manually by the user, automatically by the application, or by some combination of inputs. In response to selection of the hat template, a hat overlay 204 is displayed on the viewfinder. The hat overlay 204 may depict a transparent image of a hat that may result in the most accurate search results for an object of a hat type when the object is captured in that particular orientation.

In this particular example, a shoe 206 is displayed in the viewfinder. Since the shoe 206 does not conform to the hat overlay 204, the interface may detect that an inappropriate overlay has been selected, such as by noting that the general shape of the object in the viewfinder does not conform with the object in the overlay. The interface 200 may display a visual indication as to whether the object appears to conform to the overlay, such as by the status indicator 208, which displays an "X" icon when it appears the overlay is inappropriate or misaligned.

Figure 3:
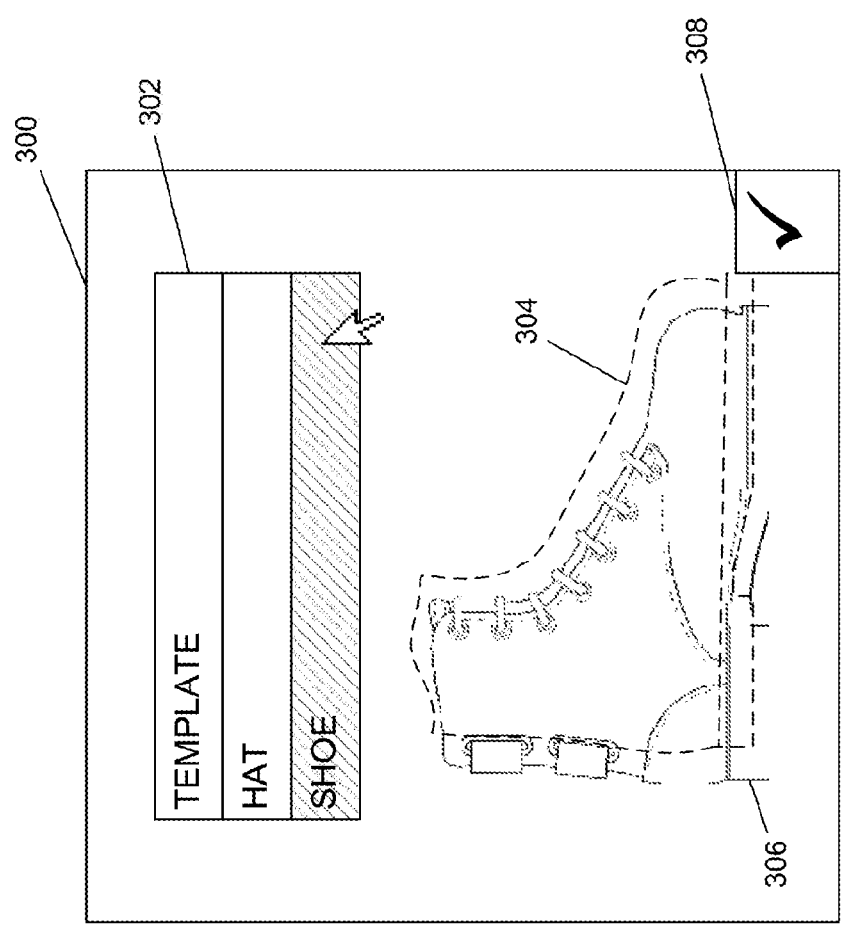
FIG. 3 is a diagram depicting another example of an image capture interface in accordance with aspects of the disclosure.

FIG. 3 is a diagram depicting another example of an image capture interface 300 in accordance with aspects of the disclosure. In this depiction of the interface 300, a "shoe" template has been selected from a drop-down menu 302, and a shoe 306 is displayed in accordance with a shoe overlay 304. Thus, a status indicator 308 may identify that the image appears to conform to the overlay and that the captured image may return accurate search results. Thus, the status indicator 308 may display a "check" icon to indicate that the image is appropriate for capturing.

Figure 4:
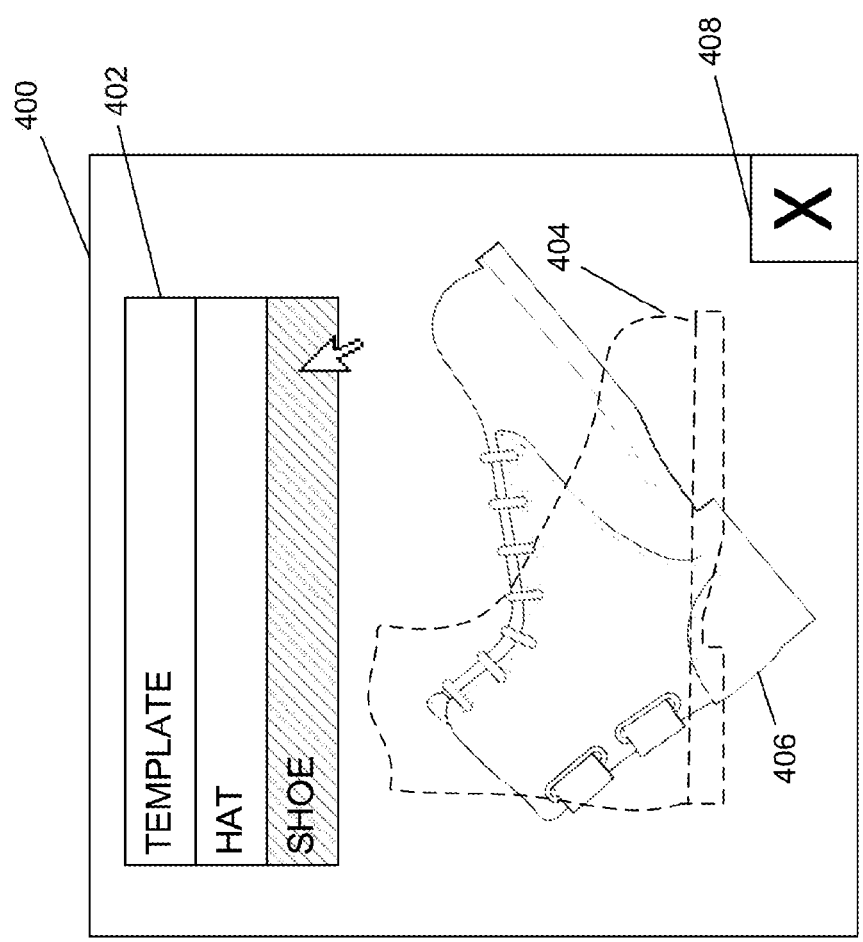
FIG. 4 is a diagram depicting another example of an image capture interface in accordance with aspects of the disclosure.

FIG. 4 is a diagram depicting yet another example of an image capture interface 400 in accordance with aspects of the disclosure. This example shows how the overlay may indicate the proper positioning of an object element by showing how a misaligned object does not conform to the overlay. In this depiction of the interface 400, a "shoe" template has been selected from a drop-down menu 402, and a shoe overlay 404 is displayed in a viewfinder over a shoe 406. However, the angle of the shoe does not conform to the angle of the overlay. Thus, an image captured in this configuration would not conform to the overlay, and thus not provide optimal image search results. The status indicator 408 may display the "X" icon to indicate that this image would not be appropriate for generating accurate search results.

Figure 5:
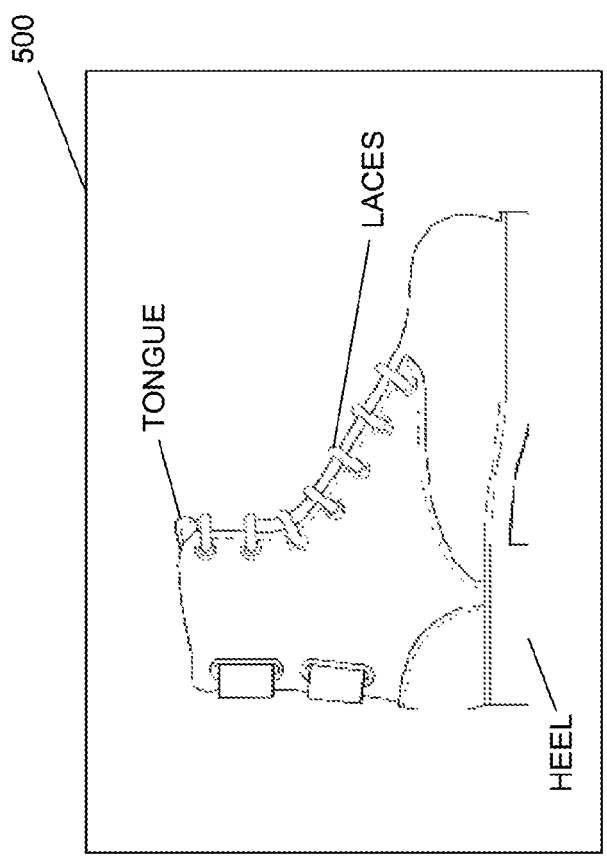
FIG. 5 is a diagram depicting an example of an image search template in accordance with aspects of the disclosure.

FIG. 5 is a diagram depicting an example of an image search template 500 in accordance with aspects of the disclosure. As described above, a canonical image or view may be identified for a particular category of items. Templates established in this manner may be useful for segmenting important objects from larger images, and these same techniques may be utilized to segment important image features from the segmented objects. For example, once a "canonical shoe" is established from a category of shoes, it is possible to identify particular distinguishing features of the shoe, such as the style of the tongue, laces, and heel, as depicted in FIG. 5. These particular features may be identified in the image used as a search query and used as points of distinction when performing an image search using such a template, such that, in the present example, shoes with similar tongues, heels, and laces may be identified as relevant search results. These particular features may be manually specified, such as by a curator, or automatically determined by identifying common points of distinction among objects in the same category.

Figure 6:
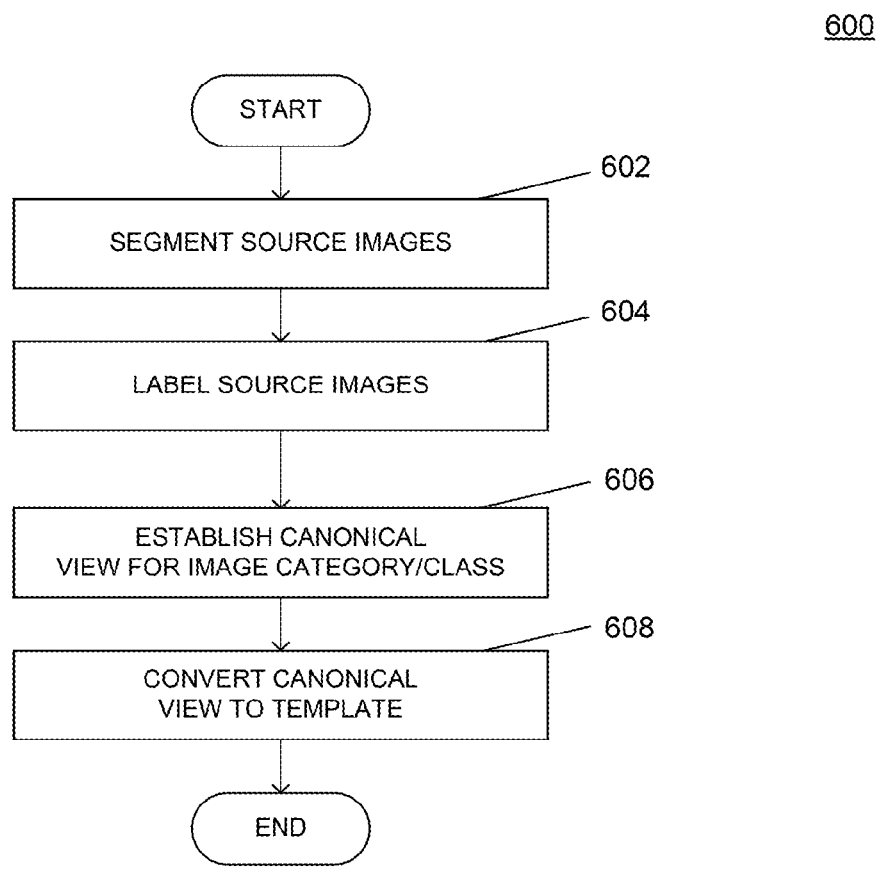
FIG. 6 is a flow diagram depicting an example of a method for generating an image template in accordance with aspects of the disclosure.

FIG. 6 is a flow diagram depicting an example of a method 600 for generating an image template in accordance with aspects of the disclosure. In order to generate useful templates to aid image capturing operations and improve image search results, the image database 136 may be processed and analyzed to group images into particular categories and/or subcategories. The categories and subcategories may be associated with particular templates. The templates may be provided to users as described above, to assist with capturing images for use in image search operations.

At stage 602, source images are segmented to identify pixels that are associated with an object of interest contained within the image. For example, a picture of a shoe sitting on a table would have the elements of the picture associated with the shoe identified as "important" pixels. This stage may be performed in conjunction with stage 604, where labels are applied to the source images. These labels may be used in the segmentation process to identify an object type, e.g., searching for a shoe in an object that is labeled "shoe". As described above, labels may be associated with images in the image database in the image metadata or in a separate data structure within the database. These labels may be manually or automatically associated with the images as described above. The labeling process may coincide with defining different categories or classes of images. For example, all images with the label "shoe" may be categorized into a "shoe" category. Subcategories may also exist, such as "sneakers," "high heels," and "boots," in relation to the "shoe" category.

At stage 606, a canonical view is established for each image category. As described above, the canonical view may be generated by clustering images from the same category into similar views, and selecting the similar view with the greatest number of associated images in the cluster as the canonical view. Other techniques for choosing a representative cluster may also be utilized. For example, a cluster with the most diverse images may be selected, or a cluster with the most labels associated with the particular image category may be selected. A canonical view may also be established manually, via a combination of manual and automatic processing methods, or via other automatic processing methods, e.g., identifying points of distinction among images in a category and selecting a view that maximizes capturing of these points of distinction.

At stage 608, the established canonical view is converted to a template for use in the image capturing process. This conversion process may include selecting an image that was taken in the canonical viewpoint and converting the image to a transparent format suitable for use in an overlay during an image capturing process. The creation of a template may also include associating the template with particular labels, identifying particular points of distinction within the canonical image for performance of search operation, and conversion of the image and other data into a format suitable for transmission and use by a device during an image capture operation.

Figure 7:
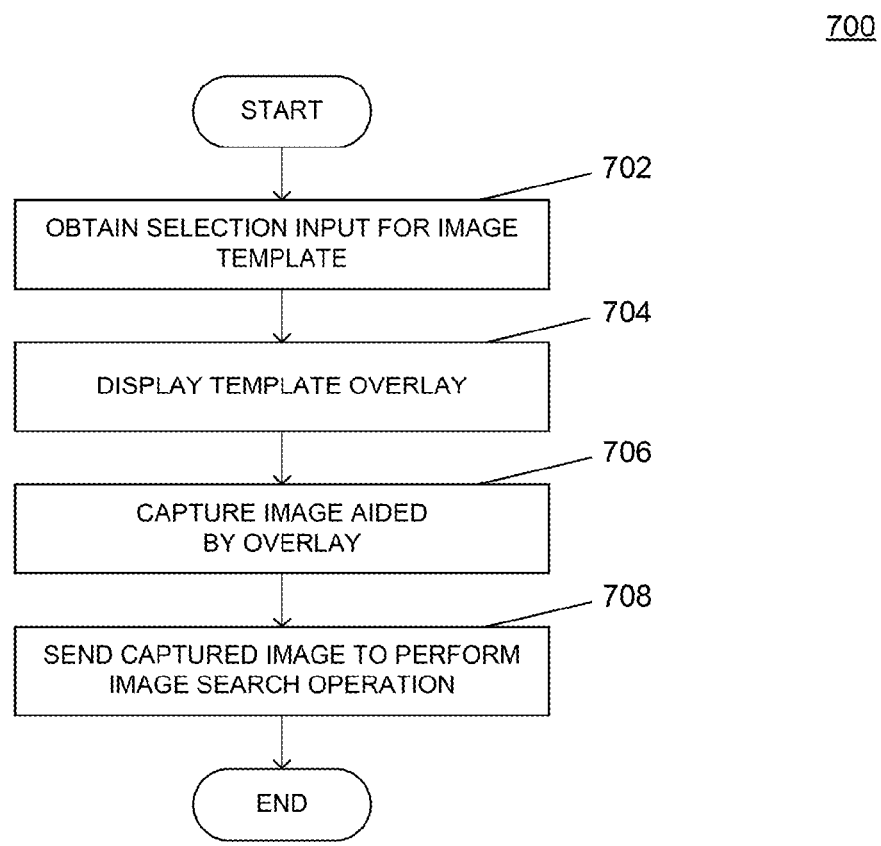
FIG. 7 is a flow diagram depicting an example of a method for initiating an image search operation in accordance with aspects of the disclosure.

FIG. 7 is a flow diagram depicting an example of a method 700 for initiating an image search operation in accordance with aspects of the disclosure. The use of image acquisition templates allows for improved image search accuracy by guiding the user during image capture to maximize the chance that important features will be identified and used as search criteria. For example, a user in a shoe store may wish to identify other shoes similar to a type they are trying on, or they may wish to identify other retailers that carry the same shoe, e.g., to perform a price check, to check inventory if their size is unavailable, etc. In a standard image search operation, merely taking a picture of a shoe may not be sufficient to receive accurate search results, as it may not be clear that the user wishes to obtain information on the shoe, as opposed to the store in which the shoe is displayed, or other ancillary data that may be captured in the image. As such, the use of an image template allows for indication to the device performing the search that the desired information pertains to a shoe object contained in the image. Although the present example indicates that the method 700 is performed in concert with an image capture operation, the template selection and overlay process can also be used with images the user has previously captured without the aid of an overlay, and image search operations may be performed by association with a template and/or overlay after the capture operation has occurred.

At stage 702, selection input is received for an image acquisition template. As described above, the image template may be selected manually by the user or automatically by an application. The selection input may be received or otherwise obtained by a processor of the system in response to such selection. The image template identifies the type of object that is intended to be the subject of the image search. In the instant example of a shoe store, the user may select a shoe template from a drop-down menu, or the capturing device may identify a shoe in the forefront of the image and apply the shoe template.

At stage 704, an overlay associated with the template is displayed in the viewfinder of the image capture device. This overlay may define a particular pose or angle that will optimize the results from an image search operation performed in response to the capturing of the image. In the present example, a horizontal image of a shoe with the sole flat may be identified in an overlay as a canonical view having an optimal angle from which to take the image.

At stage 706, the image is captured. During the capturing operation, metadata may be embedded within the image to indicate the template used to perform the capture. This metadata may be extracted by an image search engine to aid in identification of the important object in the image. The image capturing process may be aided by an application that indicates the accuracy of the overlay with the image displayed in the viewfinder to indicate when the image is properly overlaid in the correct format. For example, a status indicator may notify the user when the object is displayed at the correct angle.

At stage 708, the captured image may be used to perform an image search operation. The image may be provided to a server 104 and the server 104 may perform the image search, for instance by also using the image template data. As described above, the server 104 may receive data indicating the image template used in the capture operation, either embedded in the image or as a separate set of data. Alternately, the server 104 may not receive data describing the template used, and the server 104 may process the image as a normal image search. In such cases, the accuracy of search results may still be improved by ensuring that the object of interest is displayed in the viewfinder in such a way as to maximize the accuracy of search results.

Figure 8:
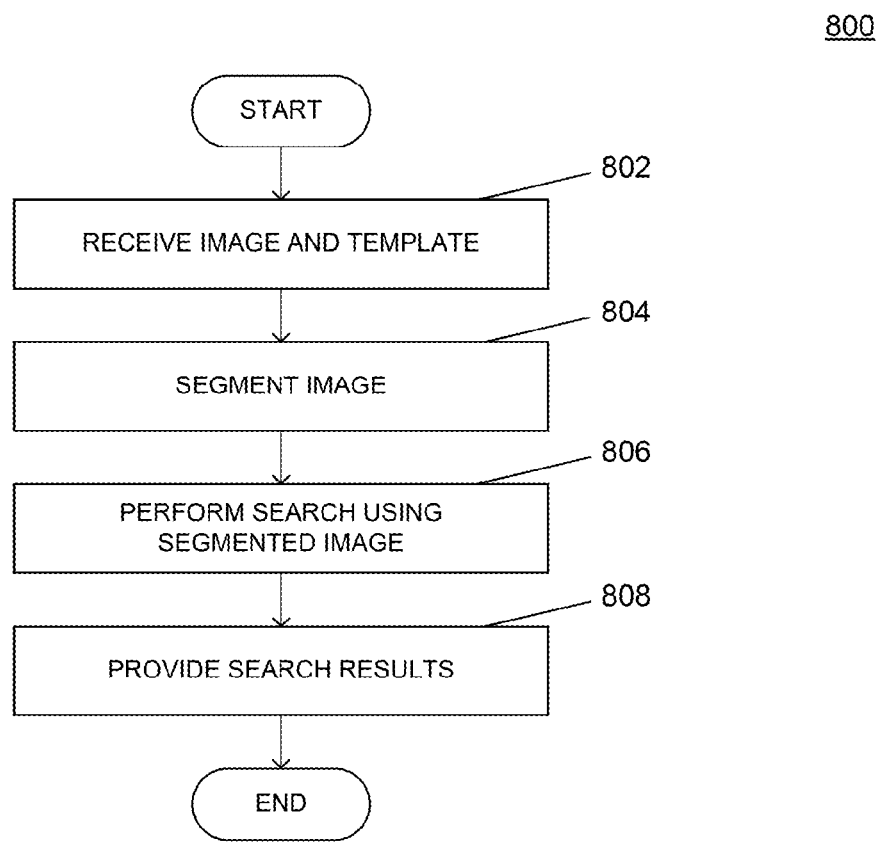
FIG. 8 is a flow diagram depicting an example of a method for providing image search results in response to an image search query in accordance with aspects of the disclosure.

FIG. 8 is a flow diagram depicting an example of a method 800 for providing image search results in response to an image search query in accordance with aspects of the disclosure. The present example method 800 depicts an image search operation where the image acquisition template used by the capturing device is known to the image search engine, though, as described above, such an image search operation could also be performed without awareness of the template by the search engine.

At stage 802, an image and template are received by an image search engine. As described above, the image may have template information embedded in metadata associated with the image, or the template information used to capture the image may be specified to the image search engine separately.

At stage 804, the image is segmented to identify important objects within the image. For example, in a picture of a shoe, the shoe may be identified as an important object, with the table and background the shoe in front of which the shoe is presented being disregarded as unimportant for the image search process. The segmentation of the image may be informed by the template used to capture the image. For example, in a picture of scene containing a shoe, a watch, and a hat, the search engine may identify the shoe as important when captured using a shoe template, the watch as important when captured using a watch template, or the hat as important when captured using a hat template.

At stage 806, a search is performed using the segmented aspects of the image. The search may be constrained using the capture template. For example, if an image is captured using a shoe template, then the image search may be performed of images and objects that belong to a shoe category, even to the extent of disregarding similar images that are not associated with the category of the capture template.

At stage 808, results are provided based on the image search operation. Results may be provided in a variety of manners, such as links to images that are similar to the source image, links to objects that are similar to the object in the image, or product links to merchants that are selling the item. These results may be displayed via a browser on the client 102, in the image capturing application 116, stored for later use, or in any other format.

The use of templates in the manner described herein advantageously provides for increased accuracy in search results by ensuring that images used for search operations are provided in an optimal format for searching. These templates assist users in the capture operation and allow for search results to be constrained to a particular category of relevant items and allow for improved segmentation of images to identify important objects and features.

The stages of the illustrated methods are not intended to be limiting. The functionality of the methods can exist in a fewer or greater number of stages than what is shown and, even with the depicted methods, the particular order of events may be different from what is shown in the figures.

The techniques described herein advantageously provide for an improved method and system for performing searches based on target images. By associating source images with semantic entities, more accurate searching is possible in circumstances where images may be associated with text that is otherwise ambiguous. By associating images within a database with semantic entities prior to the search operation, similar images may be identified for efficient matching to previously identified semantic entities without the need to identify entity associations with images stored in the database at the time of the search operation. The use of confidence values and multiple semantic entity associations for the images allows for a flexible semantic entity matching technique that may be weighted to ensure accuracy of the matched semantic entity.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure, as well as clauses phrased as "such as," "e.g.", "including" and the like, should not be interpreted as limiting the disclosure to the specific examples; rather, the examples are intended to illustrate only some of many possible embodiments.

The invention claimed is:

1. A computer-implemented method, comprising:
   receiving, by a mobile device that includes a camera and a display, data identifying a selected image acquisition template associated with a particular type of object, from among multiple image acquisition templates that are stored on the multiple device and that are each associated with a different type of object;
   providing a pattern associated with the selected image acquisition template for output on the display;
   generating, by the camera included on the mobile device, a query image while the pattern associated with the selected image acquisition template is provided for output on the display;
   providing, to a search engine, an image search query that includes (i) the query image, and (ii) an indication of the selected image acquisition template; and
   receiving, from the search engine, one or more image search results in response to the image search query.

2. The computer-implemented method of claim 1, wherein receiving the data identifying the selected image acquisition template is based on at least one of a selection by a user and automatic selection of the selected image acquisition template by the mobile device based on identifying a general category of the particular type of the object.

3. The computer-implemented method of claim 2, further comprising:
receiving, at the mobile device, a selection of a specific category of the particular type of the object in response to the client device identifying the general category of the particular type of the object.

4. The computer-implemented method of claim 1, wherein providing the pattern associated with the selected image acquisition template for the output on the display is provided to depict a capturing feature such that capturing an object in the query image yields optimal results in an image search operation.

5. The computer-implemented method of claim 1, wherein generating the query image while the pattern associated with the selected image acquisition template is provided for the output on the display comprises:
providing, at the mobile device, metadata associated with the selected image acquisition template in the generated query image to aid in an identification of the particular type of the object.

6. The computer-implemented method of claim 1, further comprising:
detecting, at the mobile device, an inappropriate alignment between a general shape of the particular type of the object and the pattern associated with the selected image acquisition template.

7. The computer-implemented method of claim 6, further comprising:
providing an indication of the inappropriate alignment between the particular type of the object and the pattern associated with the selected image acquisition template to the display of the mobile device.

8. A system comprising:
one or more computers and one or more storage devices storing instructions that are operable, when executed by the one or more computers, to cause the one or more computers to perform operations comprising:
receiving, by a mobile device that includes a camera and a display, data identifying a selected image acquisition template associated with a particular type of object, from among multiple image acquisition templates that are stored on the multiple device and that are each associated with a different type of object;
providing a pattern associated with the selected image acquisition template for output on the display;
generating, by the camera included on the mobile device, a query image while the pattern associated with the selected image acquisition template is provided for output on the display;
providing, to a search engine, an image search query that includes (i) the query image, and (ii) an indication of the selected image acquisition template; and
receiving, from the search engine, one or more image search results in response to the image search query.

9. The system of claim 8, wherein receiving the data identifying the selected image acquisition template is based on at least one of a selection by a user and automatic selection of the selected image acquisition template by the mobile device based on identifying a general category of the particular type of the object.

10. The system of claim 9, wherein the operations further comprise:
receiving, at the mobile device, a selection of a specific category of the particular type of the object in response to the client device identifying the general category of the particular type of the object.

11. The system of claim 8, wherein providing the pattern associated with the selected image acquisition template for the output on the display is provided to depict a capturing feature such that capturing an object in the query image yields optimal results in an image search operation.

12. The system of claim 8, wherein generating the query image while the pattern associated with the selected image acquisition template is provided for the output on the display the operations further comprise:
providing, at the mobile device, metadata associated with the selected image acquisition template in the generated query image to aid in an identification of the particular type of the object.

13. The system of claim 8, wherein the operations further comprise:
detecting, at the mobile device, an inappropriate alignment between a general shape of the particular type of the object and the pattern associated with the selected image acquisition template.

14. The system of claim 13, wherein the operation further comprise:
providing an indication of the inappropriate alignment between the particular type of the object and the pattern associated with the selected image acquisition template to the display of the mobile device.

15. A non-transitory computer-readable medium storing software comprising instructions executable by one or more computers which, upon such execution, cause the one or more computers to perform operations comprising:
receiving, by a mobile device that includes a camera and a display, data identifying a selected image acquisition template associated with a particular type of object, from among multiple image acquisition templates that are stored on the multiple device and that are each associated with a different type of object;
providing a pattern associated with the selected image acquisition template for output on the display;
generating, by the camera included on the mobile device, a query image while the pattern associated with the selected image acquisition template is provided for output on the display;
providing, to a search engine, an image search query that includes (i) the query image, and (ii) an indication of the selected image acquisition template; and
receiving, from the search engine, one or more image search results in response to the image search query.

16. The computer-readable medium of claim 15, wherein receiving the data identifying the selected image acquisition template is based on at least one of a selection by a user and automatic selection of the selected image acquisition template by the mobile device based on identifying a general category of the particular type of the object.

17. The computer-readable medium of claim 16, wherein the operations further comprise:
receiving, at the mobile device, a selection of a specific category of the particular type of the object in response to the client device identifying the general category of the particular type of the object.

18. The computer-readable medium of claim 15, wherein providing the pattern associated with the selected image acquisition template for the output on the display is provided to depict a capturing feature such that capturing an object in the query image yields optimal results in an image search operation.

19. The computer-readable medium of claim 15, wherein generating the query image while the pattern associated with the selected image acquisition template is provided for the output on the display the operations further comprise:
   providing, at the mobile device, metadata associated with the selected image acquisition template in the generated query image to aid in an identification of the particular type of the object.

20. The computer-readable medium of claim 15, wherein the operations further comprise:
   detecting, at the mobile device, an inappropriate alignment between a general shape of the particular type of the object and the pattern associated with the selected image acquisition template.

* * * * *